(12) United States Patent
Pfau et al.

(10) Patent No.: US 11,150,335 B2
(45) Date of Patent: *Oct. 19, 2021

(54) PROCESSING UNIT AND PROCESSING METHOD FOR FORWARD RECOGNITION SYSTEM, FORWARD RECOGNITION SYSTEM, AND MOTORCYCLE

(71) Applicant: Robert Bosch GmbH, Stuttgart (DE)

(72) Inventors: Lars Pfau, Kanagawa (JP); S N Prashanth, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 129 days.

This patent is subject to a terminal disclaimer.

(21) Appl. No.: 16/621,727

(22) PCT Filed: May 15, 2018

(86) PCT No.: PCT/IB2018/053375
§ 371 (c)(1),
(2) Date: Dec. 12, 2019

(87) PCT Pub. No.: WO2018/229567
PCT Pub. Date: Dec. 20, 2018

(65) Prior Publication Data
US 2020/0132824 A1 Apr. 30, 2020

(30) Foreign Application Priority Data
Jun. 12, 2017 (JP) .............................. JP2017-115128

(51) Int. Cl.
*G08G 1/0967* (2006.01)
*G01S 13/04* (2006.01)
(Continued)

(52) U.S. Cl.
CPC .............. *G01S 13/04* (2013.01); *G01S 7/412* (2013.01); *G01S 13/931* (2013.01); *G08G 1/166* (2013.01); *G01S 2013/93271* (2020.01)

(58) Field of Classification Search
CPC ........ G01S 13/04; G01S 7/412; G01S 13/931; G01S 2013/93271; G08G 1/166
See application file for complete search history.

(56) References Cited

U.S. PATENT DOCUMENTS 5,426,571 A    6/1995   Jones
2010/0079270 A1*   4/2010   Krautter ................ B60K 35/00
                                                                                             340/436
(Continued)

FOREIGN PATENT DOCUMENTS

DE    102007053274    5/2009
DE    102012221188    5/2014
(Continued)

OTHER PUBLICATIONS

International Search Report for Application No. PCT/IB2018/053375 dated Aug. 27, 2018 (English Translation, 3 pages).

*Primary Examiner* — Munear T Akki
(74) *Attorney, Agent, or Firm* — Michael Best & Friedrich LLP

(57) ABSTRACT

A processing unit includes: an acquisition section that acquires forward environment information corresponding to output of a forward environment detector; a recognition section that recognizes the target on the basis of the forward environment information; and a control section that controls the forward environment detector. During travel of the motorcycle, the acquisition section acquires posture information related to a bank angle of the motorcycle, and the control section changes a detection angle range for forward detection of the motorcycle by the forward environment detector in accordance with the posture information.

16 Claims, 4 Drawing Sheets

(51) Int. Cl.
*G01S 7/41* (2006.01)
*G01S 13/931* (2020.01)
*G08G 1/16* (2006.01)

(56) References Cited

U.S. PATENT DOCUMENTS

| | | | | |
|---|---|---|---|---|
| 2016/0133131 | A1* | 5/2016 | Grimm | G08G 1/096725 |
| | | | | 701/117 |
| 2017/0225619 | A1* | 8/2017 | Torii | G08G 1/167 |
| 2018/0194282 | A1* | 7/2018 | Wolterman | B60W 50/0097 |
| 2019/0271543 | A1* | 9/2019 | Serita | B60L 15/10 |
| 2020/0331460 | A1* | 10/2020 | Igari | B60W 30/04 |
| 2021/0031856 | A1* | 2/2021 | Galley | B62J 50/23 |

FOREIGN PATENT DOCUMENTS

| | | |
|---|---|---|
| DE | 102015207330 | 10/2016 |
| JP | 2009116882 | 5/2009 |

\* cited by examiner

PROCESSING UNIT AND PROCESSING METHOD FOR FORWARD RECOGNITION SYSTEM, FORWARD RECOGNITION SYSTEM, AND MOTORCYCLE

BACKGROUND OF THE INVENTION

The invention relates to a processing unit and a processing method for a forward recognition system that recognizes a target ahead of a traveling motorcycle by using a forward environment detector provided in the motorcycle, a forward recognition system that includes the processing unit, and a motorcycle that includes the forward recognition system.

As a technique related to a motorcycle (a two-wheeled motor vehicle or a three-wheeled motor vehicle), a forward recognition system that recognizes a target (for example, an obstacle, a preceding vehicle, a traffic sign, or the like) ahead of the traveling motorcycle has been known. The forward recognition system acquires forward environment information that corresponds to output of a forward environment detector provided in the motorcycle, and recognizes the target on the basis of the forward environment information. When the forward recognition system recognizes the target, various functions (for example, a warning function, an emergency braking function, a cruise control function, and the like) are achieved to assist a rider's operation (for example, see JP-A-2009-116882).

SUMMARY OF THE INVENTION

In the conventional forward recognition system, a detection angle range of the forward environment detector is set with assumption of a state where the motorcycle travels straight. When the motorcycle turns, the forward environment detector performs detection in a front direction of the motorcycle, that is, performs detection in a direction offset from an advancing direction of the motorcycle. Accordingly, in a state where the motorcycle turns, despite a fact that the forward recognition system should recognize the target located in the advancing direction, the target is located on the outside of a detection range of the forward environment detector until the motorcycle approaches the target. As a result, recognition of the target is delayed. In particular, when a large bank angle is generated in the motorcycle during turning, a vehicle body becomes unstable. Thus, during turning, it is desired to recognize the target at an as early stage as possible. However, the conventional forward recognition system possibly faces a difficulty in assisting the rider's operation safely due to the delay.

The invention has been made with the above-described problem as the background and therefore obtains a processing unit and a processing method capable of preventing a delay in recognition of a target in a state where a motorcycle turns. The invention also obtains a forward recognition system that includes the processing unit. The invention further obtains a motorcycle that includes the forward recognition system.

A processing unit according to the invention is a processing unit for a forward recognition system that recognizes a target ahead of a traveling motorcycle by using a forward environment detector provided in the motorcycle, and includes: an acquisition section that acquires forward environment information corresponding to output of the forward environment detector; and a recognition section that recognizes the target on the basis of the forward environment information. The processing unit further includes a control section that controls the forward environment detector. During travel of the motorcycle, the acquisition section acquires posture information related to a bank angle of the motorcycle, and the control section changes a detection angle range for forward detection of the motorcycle by the forward environment detector in accordance with the posture information.

A forward recognition system according to the invention includes the above processing unit and the forward environment detector.

A motorcycle according to the invention includes the above forward recognition system.

A processing method according to the invention is a processing method for a forward recognition system that recognizes a target ahead of a traveling motorcycle by using a forward environment detector provided in the motorcycle, and includes: an acquisition step of acquiring forward environment information that corresponds to output of the forward environment detector; and a recognition step of recognizing the target on the basis of the forward environment information. The processing method further includes a control step of controlling the forward environment detector. During travel of the motorcycle, posture information related to a bank angle of the motorcycle is acquired in the acquisition step, and a detection angle range for forward detection of the motorcycle by the forward environment detector is changed in accordance with the posture information in the control step.

In the processing unit, the forward recognition system, the motorcycle, and the processing method according to the invention, the detection angle range of the forward environment detector is changed in accordance with the posture information related to the bank angle of the motorcycle. Therefore, in a state where the motorcycle turns, that is, in a state where the large bank angle is generated in the motorcycle and a vehicle body becomes unstable, it is possible to recognize the target located in an advancing direction at an appropriate stage.

DETAILED DESCRIPTION

Figure 1:
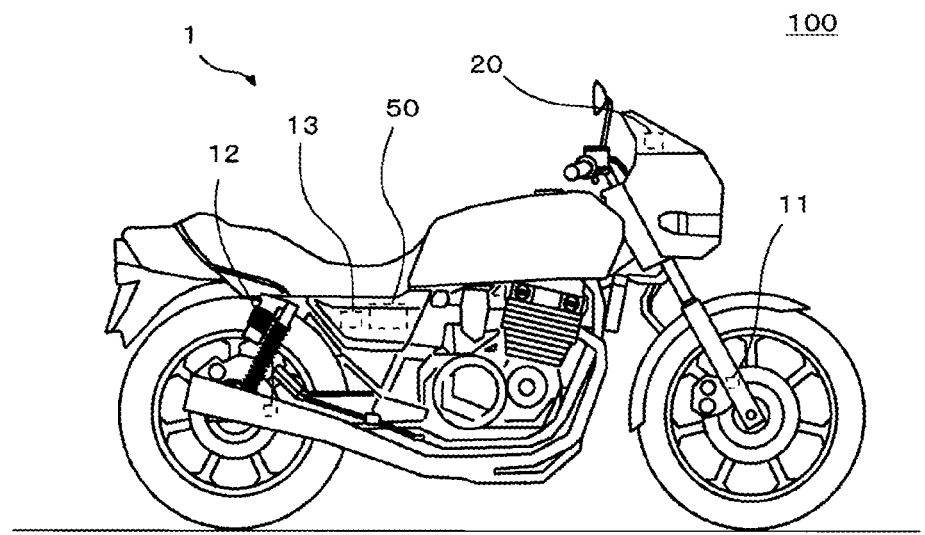
FIG. 1 is a view of a state where a forward recognition system according to a first embodiment of the invention is mounted on a motorcycle.

A description will hereinafter be made on a processing unit, a forward recognition system, a motorcycle, and a processing method according to the invention by using the drawings.

Note that each of a configuration, an operation, action, and the like, which will be described below, is merely one example, and the processing unit, the forward recognition system, the motorcycle, and the processing method according to the invention are not limited to a case with such a configuration, such an operation, such action, and the like.

For example, a description will hereinafter be made on a case where the motorcycle is a two-wheeled motor vehicle; however, the motorcycle may be a three-wheeled motor vehicle. In addition, a description will hereinafter be made on a case where a forward environment detector is configured to be able to switch two sensing systems; however, the forward environment detector may be configured to be able to switch three or more sensing systems. Furthermore, a description will hereinafter be made on a case where each of the sensing systems is constructed of a radar transceiver; however, each of the sensing systems may be constructed of a device that performs detection by using another principle (for example, an ultrasonic transceiver or the like).

The same or similar description will appropriately be simplified or will not be made below. In the drawings, the same or similar portions will be denoted by the same reference signs. In addition, a detailed structure will appropriately be depicted in a simplified manner or will not be depicted.

First Embodiment

A description will hereinafter be made on a forward recognition system according to a first embodiment.

<Configuration of Forward Recognition System>

A description will be made on a configuration of the forward recognition system according to the first embodiment.

Figure 2:
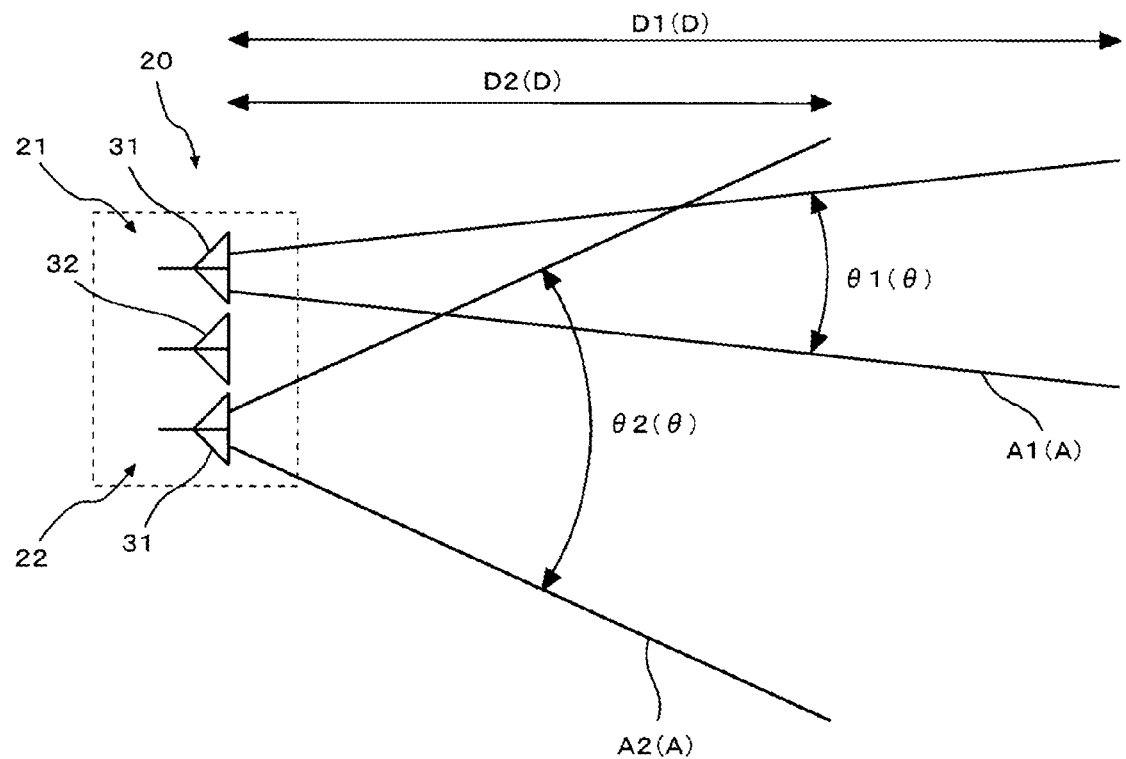
FIG. 2 is a view of a configuration of a forward environment detector in the forward recognition system according to the first embodiment of the invention.
Figure 3:
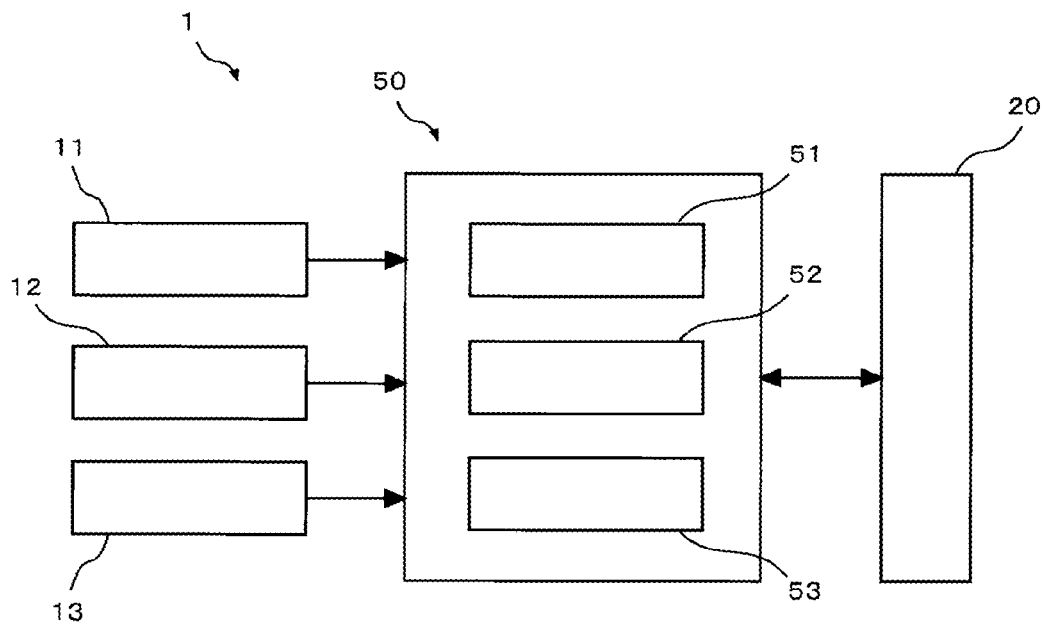
FIG. 3 is a system configuration diagram of the forward recognition system according to the first embodiment of the invention.

FIG. 1 is a view of a state where the forward recognition system according to the first embodiment of the invention is mounted on a motorcycle. FIG. 2 is a view of a configuration of a forward environment detector in the forward recognition system according to the first embodiment of the invention. FIG. 3 is a system configuration diagram of the forward recognition system according to the first embodiment of the invention.

As depicted in FIG. 1, a forward recognition system 1 is mounted on a motorcycle 100. The forward recognition system 1 includes: a front-wheel rotational frequency sensor 11 that detects a rotational frequency of a front wheel; a rear-wheel rotational frequency sensor 12 that detects a rotational frequency of a rear wheel; an inertial measurement unit (IMU) 13 that detects inertia generated in the motorcycle 100; a forward environment detector 20 that detects environment forward of the motorcycle 100; and a processing unit (an ECU) 50.

The forward recognition system 1 plays a role of recognizing a target (for example, an obstacle, a preceding vehicle, a traffic sign, or the like) ahead of the traveling motorcycle 100 by using the forward environment detector 20. Information on the target that is recognized by the forward recognition system 1 is supplied to various systems that achieve functions to assist a rider's operation (for example, a warning function, an emergency braking function, a cruise control function, and the like). Each unit in the forward recognition system 1 may exclusively be used in the forward recognition system 1 or may also be used in another system.

The front-wheel rotational frequency sensor 11 outputs the detected rotational frequency of the front wheel to the processing unit 50. The front-wheel rotational frequency sensor 11 may detect another physical quantity that can substantially be converted to the rotational frequency of the front wheel. The rear-wheel rotational frequency sensor 12 outputs the detected rotational frequency of the rear wheel to the processing unit 50. The rear-wheel rotational frequency sensor 12 may detect another physical quantity that can substantially be converted to the rotational frequency of the rear wheel.

The inertial measurement unit 13 includes a three-axis gyroscope sensor and a three-directional acceleration sensor, for example, and outputs the detected inertia to the processing unit 50. The inertial measurement unit 13 may detect another physical quantity that can substantially be converted to the inertia generated in the motorcycle 100. Alternatively, the inertial measurement unit 13 may be another detector that can acquire posture information related to a bank angle θL of the motorcycle 100.

As depicted in FIG. 2, the forward environment detector 20 includes a first sensing system 21 and a second sensing system 22 that have different detection ranges A from each other. More specifically, the first sensing system 21 is a sensing system that has a first small detection angle range θ1 and a first long detection distance range D1. The second sensing system 22 is a sensing system that has: a second detection angle range θ2 that is larger than the first detection angle range θ1; and a second detection distance range D2 that is shorter than the first detection distance range D1.

In a mode depicted in FIG. 2, the detection angle ranges θ of the first sensing system 21 and the second sensing system 22 are switched by changing a transmitter 31. More specifically, the first sensing system 21 is configured by including: the transmitter 31 whose transmitting angle range is θ1; and a receiver 32. The second sensing system 22 is configured by including: the transmitter 31 whose transmitting angle range is θ2; and the receiver 32 that is shared with the first sensing system 21. The transmitter 31 whose transmitting angle range is θ1 corresponds to the "first sensing element" of the invention, and the transmitter 31 whose transmitting angle range is θ2 corresponds to the "second sensing element" of the invention.

The detection angle ranges θ of the first sensing system 21 and the second sensing system 22 may be switched by changing the receiver 32. More specifically, the first sensing system 21 may be configured by including: the transmitter 31; and the receiver 32 whose receiving angle range is θ1. The second sensing system 22 may be configured by including: the transmitter 31 that is shared with the first sensing system 21; and the receiver 32 whose receiving angle range is θ2. In such a case, the receiver 32 whose receiving angle range is θ1 corresponds to the "first sensing element" of the invention, and the receiver 32 whose receiving angle range is θ2 corresponds to the "second sensing element" of the invention. Note that the detection angle ranges θ of the first sensing system 21 and the second sensing system 22 may be switched by changing both of the transmitter 31 and the receiver 32.

As depicted in FIG. 3, the processing unit 50 includes an acquisition section 51, a recognition section 52, and a control section 53. The sections of the processing unit 50 may collectively be provided in a single casing or may separately be provided in multiple casings. In addition, the processing unit 50 may partially or entirely be constructed of a microcomputer, a microprocessor unit, or the like, may be constructed of a member in which firmware and the like can be updated, or may be a program module or the like that is executed by a command from a CPU or the like, for example.

During travel of the motorcycle 100, the acquisition section 51 of the processing unit 50 receives output of the forward environment detector 20 and acquires forward environment information that corresponds to the output. Then, the recognition section 52 performs known arithmetic processing on the forward environment information so as to recognize the target (for example, the obstacle, the preceding vehicle, the traffic sign, or the like), and outputs the information on the target to another system (not depicted).

In addition, the acquisition section 51 of the processing unit 50 acquires travel information related to a vehicle speed V of the motorcycle 100 on the basis of the output of the front-wheel rotational frequency sensor 11 and the output of the rear-wheel rotational frequency sensor 12. The travel information related to the vehicle speed V may be information on the vehicle speed V itself or information on another physical quantity that can substantially be converted to the vehicle speed V (for example, a characteristic amount of vibrations generated in the motorcycle 100). For example, the vehicle speed V can be calculated by converting higher one of the rotational frequency of the front wheel and the rotational frequency of the rear wheel. The vehicle speed V may be calculated by another known method.

Furthermore, the acquisition section 51 of the processing unit 50 acquires the posture information related to the bank angle $\theta L$ of the motorcycle 100 on the basis of output of the inertial measurement unit 13. The posture information related to the bank angle $\theta L$ may be information on the bank angle $\theta L$ itself or information on another physical quantity that can substantially be converted to the bank angle $\theta L$ (for example, a yaw rate, lateral acceleration, or the like generated in the motorcycle 100). The bank angle $\theta L$ is defined as a tilt angle of the motorcycle 100 in a rolling direction with respect to a state where the motorcycle 100 stands upright.

The control section 53 of the processing unit 50 uses the travel information and the posture information acquired by the acquisition section 51 to determine which of the first sensing system 21 and the second sensing system 22 is used for the forward detection of the motorcycle 100, and outputs a command to the forward environment detector 20.

<Operation of Forward Recognition System>

A description will be made on an operation of the forward recognition system according to the first embodiment.

Figure 4:
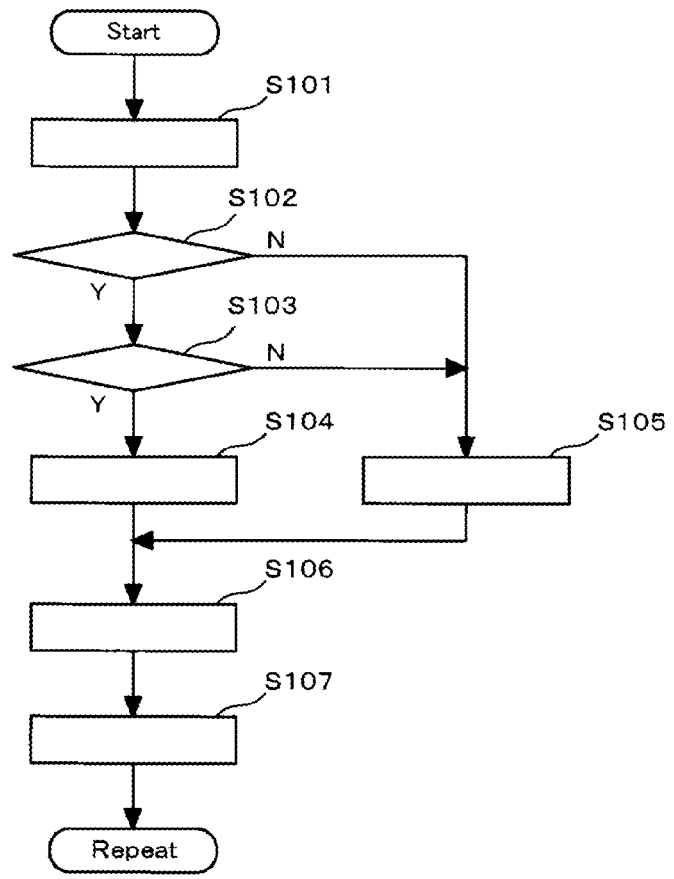
FIG. 4 is a chart of an operation flow of a processing unit in the forward recognition system according to the first embodiment of the invention.

FIG. 4 is a chart of an operation flow of the processing unit in the forward recognition system according to the first embodiment of the invention.

The processing unit 50 repeatedly executes the operation flow depicted in FIG. 4 during the travel of the motorcycle 100.

(Acquisition Step—1)

In step S101, the acquisition section 51 of the processing unit 50 acquires the travel information related to the vehicle speed V on the basis of the output of the front-wheel rotational frequency sensor 11 and the output of the rear-wheel rotational frequency sensor 12. The acquisition section 51 of the processing unit 50 also acquires the posture information related to the bank angle $\theta L$ on the basis of the output of the inertial measurement unit 13.

(Control Step)

In step S102 to step S105, the control section 53 of the processing unit 50 uses the travel information and the posture information acquired in step S101 to determine which of the first sensing system 21 and the second sensing system 22 is used for the forward detection of the motorcycle 100.

More specifically, in step S102, the control section 53 determines whether the travel information acquired in step S101 is the travel information that corresponds to the higher vehicle speed V than a reference vehicle speed Vth. If Yes, the processing proceeds to step S103. If No, the processing proceeds to step S105. In step S103, the control section 53 determines whether the posture information acquired in step S101 is the posture information that corresponds to the smaller bank angle $\theta L$ than a reference bank angle $\theta Lth$. If Yes, the processing proceeds to step S104. If No, the processing proceeds to step S105. In step S104, the control section 53 makes the forward environment detector 20 detect the environment forward of the motorcycle 100 by using the first sensing system 21. In step S105, the control section 53 makes the forward environment detector 20 detect the environment forward of the motorcycle 100 by using the second sensing system 22.

(Acquisition Step—2)

In step S106, the acquisition section 51 of the processing unit 50 acquires the forward environment information that corresponds to the output of the forward environment detector 20.

(Recognition Step)

In step S107, the recognition section 52 of the processing unit 50 processes the forward environment information acquired in step S106 so as to recognize the target (for example, the obstacle, the preceding vehicle, the traffic sign, or the like). When the bank angle $\theta L$ is generated in the motorcycle 100, the forward environment detector 20 detects the forward environment in a state of being tilted at the substantially equal angle. Thus, the forward environment information acquired by the acquisition section 51 has to be rotated for correction to offset the tilt thereof. That is, the recognition section 52 uses the posture information acquired in step S101 to correct the forward environment information acquired in step S106 and thereafter recognizes the target.

<Action of Forward Recognition System>

A description will be made on the action of the forward recognition system according to the first embodiment.

Figure 5:
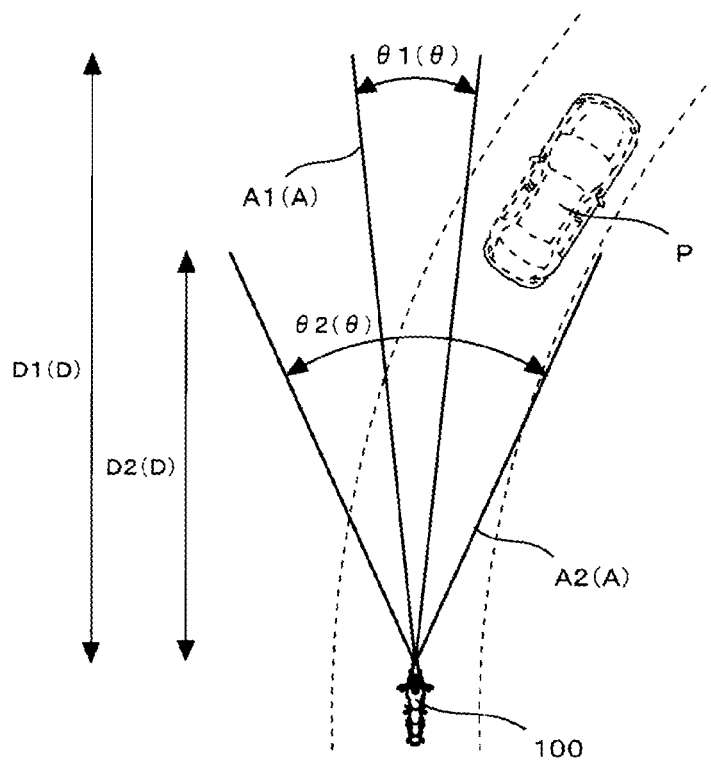
FIG. 5 is a view illustrating action of the forward recognition system according to the first embodiment of the invention.
Figure 6:
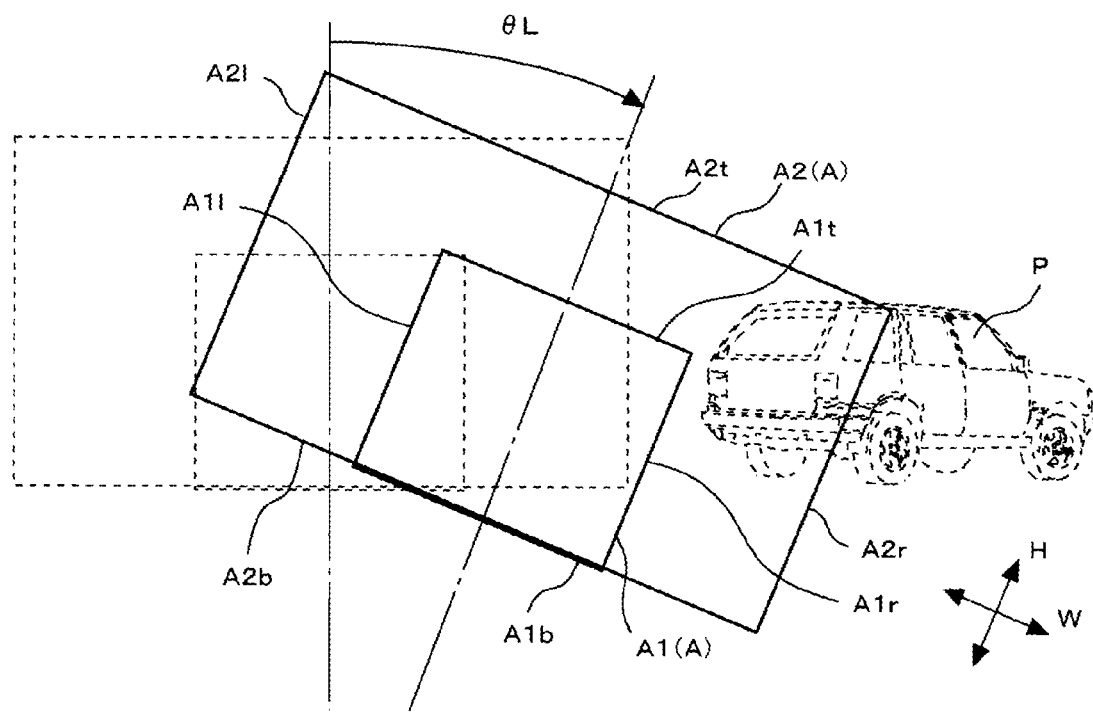
FIG. 6 is a view illustrating the action of the forward recognition system according to the first embodiment of the invention.

FIG. 5 and FIG. 6 are views illustrating the action of the forward recognition system according to the first embodiment of the invention. Note that FIG. 5 and FIG. 6 each depict a case where the processing unit 50 recognizes a preceding vehicle P as the target as an example; however, similar action can be achieved in a case where the processing unit 50 recognizes another target. FIG. 5 depicts a state where travel states of the motorcycle 100 and the preceding vehicle P are seen from the above. FIG. 6 depicts a state where the preceding vehicle P is seen from a position of the motorcycle 100.

In a state where the motorcycle 100 travels on an arterial road or the like, the first sensing system 21, which has the first long detection distance range D1, preferably detects the environment forward of the motorcycle 100. Meanwhile, in a state where the motorcycle 100 travels in an urban area or the like, the second sensing system 22, which has the second large detection angle range $\theta 2$, preferably detects the environment forward of the motorcycle 100. As depicted in FIG. 5, when the motorcycle 100 turns on the curved arterial road or the like, the preceding vehicle P as the recognition target is located on the outside of a detection range A1 of the first sensing system 21. Thus, the forward recognition system 1 cannot recognize the preceding vehicle P until the motorcycle 100 approaches the preceding vehicle P.

However, in the forward recognition system 1, in a state where the motorcycle 100 turns on the curved arterial road or the like and the bank angle $\theta L$ is generated in the motorcycle 100 as depicted in FIG. 6, the sensing system used in the forward environment detector 20 is switched from the first sensing system 21, which has the first long detection distance range D1, to the second sensing system 22, which has the second large detection angle range θ2, in accordance with the bank angle θL. Accordingly, the preceding vehicle P, which is located on the outside of the detection range A1 of the first sensing system 21, can be located within a detection range A2 of the second sensing system 22. Thus, the preceding vehicle P can be recognized at a stage before the motorcycle 100 approaches the preceding vehicle P.

Meanwhile, in a state where the motorcycle 100 travels at the lower vehicle speed V than the reference vehicle speed Vth, the second sensing system 22, which has the second large detection angle range θ2, is used for the forward detection of the motorcycle 100 even when the bank angle θL is not generated in the motorcycle 100. Thus, the target can reliably be recognized in the state where the motorcycle 100 travels in the urban area or the like.

In addition, as depicted in FIG. 6, the detection range A2 of the second sensing system 22 is configured to be larger than the detection range A1 of the first sensing system 21 both in a width direction W and a height direction H of the motorcycle 100. More specifically, it is configured that the second detection angle range θ2 of the second sensing system 22 is larger than the first detection angle range θ1 of the first sensing system 21 in the width direction W of the motorcycle 100 and that the second detection angle range θ2 of the second sensing system 22 is larger than the first detection angle range θ1 of the first sensing system 21 in the height direction H of the motorcycle 100.

A left limit A2*l* and a right limit A2*r* of the detection range A2 of the second sensing system 22 in the width direction W of the motorcycle 100 are located outside a left limit A1*l* and a right limit A1*r* of the detection range A1 of the first sensing system 21, respectively, in the width direction W of the motorcycle 100. An upper limit A2*t* of the detection range A2 of the second sensing system 22 in the height direction H of the motorcycle 100 is located outside an upper limit A1*t* of the detection range A1 of the first sensing system 21 in the height direction H of the motorcycle 100. A center axis of the detection range A2 of the second sensing system 22 is preferably located on a higher side than a center axis of the detection range A1 of the first sensing system 21 in the height direction H of the motorcycle 100.

In the state where the bank angle θL is generated in the motorcycle 100, a height position of the forward environment detector 20 from a road surface is lowered in comparison with the state where the bank angle θL is not generated in the motorcycle 100. In the forward recognition system 1, since it is configured that the upper limit A2*t* of the detection range A2 of the second sensing system 22 is located outside the upper limit A1t of the detection range A1 of the first sensing system 21, the preceding vehicle P is prevented from being located on the outside of the detection range A2 in the state where the motorcycle 100 turns and the height position of the forward environment detector 20 from the road surface is lowered.

<Effects of Forward Recognition System>

A description will be made on effects of the forward recognition system according to the first embodiment.

The processing unit 50 includes: the acquisition section 51 that acquires the forward environment information corresponding to the output of the forward environment detector 20; the recognition section 52 that recognizes the target on the basis of the forward environment information; and the control section 53 that controls the forward environment detector 20. During the travel of the motorcycle 100, the acquisition section 51 acquires the posture information related to the bank angle θL of the motorcycle 100, and the control section 53 changes the detection angle range θ for the detection of the environment forward of the motorcycle 100 by the forward environment detector 20 in accordance with the posture information. Therefore, even in the state where the motorcycle 100 turns, that is, even in a state where the large bank angle θL is generated in the motorcycle 100 and a vehicle body becomes unstable, it is possible to recognize the target located in an advancing direction at an appropriate stage.

The detection angle range θ that is changed by the control section 53 is preferably the detection angle range θ in the width direction W of the motorcycle 100. In this way, in the state where the motorcycle 100 turns, the target can reliably be recognized.

The detection angle range θ that is changed by the control section 53 is preferably the detection angle range θ in the height direction H of the motorcycle 100. In this way, in the state where the motorcycle 100 turns, the target can reliably be recognized.

During the travel of the motorcycle 100, in the case where the acquisition section 51 acquires the posture information that corresponds to the smaller bank angle θL than the reference bank angle θLth, the control section 53 preferably makes the forward environment detector 20 detect the environment forward of the motorcycle 100 in the first detection angle range θ1. In the case where the acquisition section 51 acquires the posture information that corresponds to the larger bank angle θL than the reference bank angle θLth, the control section 53 preferably makes the forward environment detector 20 detect the environment forward of the motorcycle 100 in the second detection angle range θ2 that is larger than the first detection angle range θ1. That is, instead of changing a detection direction of the forward environment detector 20 in accordance with the posture information, the control section 53 changes size of the detection angle range θ of the forward environment detector 20. Therefore, it is possible to secure adaptability to various types of environment in which the motorcycle 100 travels (for example, the arterial road, the urban area, and the like) while the target can reliably recognized in the state where the motorcycle 100 turns.

In particular, the forward environment detector 20 at least includes: the first sensing element for the forward detection of the motorcycle 100 in the first detection angle range θ1; and the second sensing element for the forward detection of the motorcycle 100 in the second detection angle range θ2. During the travel of the motorcycle 100, in the case where the acquisition section 51 acquires the posture information that corresponds to the smaller bank angle θL than the reference bank angle θLth, the control section 53 executes the forward detection of the motorcycle 100 in the first detection angle range θ1 through the forward detection of the motorcycle 100 using the first sensing element. In the case where the acquisition section 51 acquires the posture information that corresponds to the larger bank angle θL than the reference bank angle θLth, the control section 53 executes the forward detection of the motorcycle 100 in the second detection angle range θ2 through the forward detection of the motorcycle 100 using the second sensing element. That is, instead of changing a specification of the single sensing system in accordance with the posture information, the control section 53 uses multiple sensing systems in different specifications, so as to change the size of the detection angle range θ of the forward environment detector 20. Therefore, in the state where the motorcycle 100 turns, responsiveness to the target recognition is improved.

In particular, during the travel of the motorcycle 100, the acquisition section 51 acquires the travel information related to the vehicle speed V of the motorcycle 100, and the control section 53 switches between the forward detection of the motorcycle 100 in the first detection angle range θ1 and the forward detection of the motorcycle 100 in the second detection angle range θ2 in consideration of the travel information. That is, in the forward environment detector 20, the detection angle range θ that corresponds to the posture information and the detection angle range θ that corresponds to the various types of the environment in which the motorcycle 100 travels (the arterial road, the urban area, and the like) are switched for the same sensing systems. Therefore, with a simple configuration, it is possible to secure the adaptability to the various types of the environment in which the motorcycle 100 travels (for example, the arterial road, the urban area, and the like) while the target can reliably be recognized in the state where the motorcycle 100 turns.

Preferably, the recognition section 52 corrects the forward environment information by using the posture information and thereafter recognizes the target. In this way, in the state where the motorcycle 100 turns, the target can reliably be recognized.

Second Embodiment

A description will hereinafter be made on a forward recognition system according to a second embodiment.

Note that the forward recognition system according to the second embodiment differs from the forward recognition system according to the first embodiment only in terms of the operation flow of the processing unit 50. A description that overlaps or is similar to the description on the forward recognition system according to the first embodiment will appropriately be simplified or will not be made.

<Operation of Forward Recognition System>

A description will be made on an operation of the forward recognition system according to the second embodiment.

Figure 7:
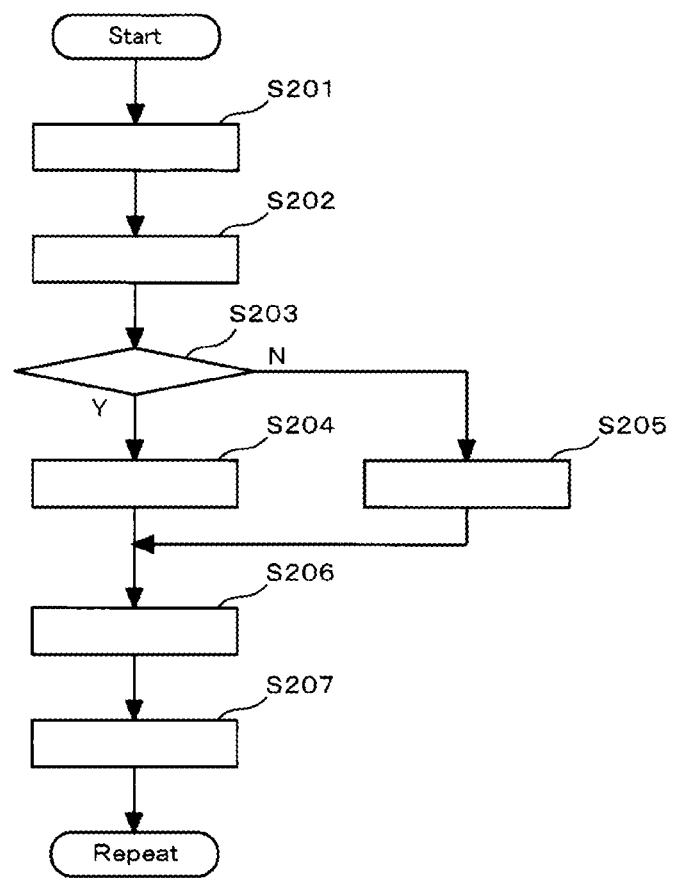
FIG. 7 is a chart of an operation flow of a processing unit in a forward recognition system according to a second embodiment of the invention.

FIG. 7 is a chart of the operation flow of the processing unit in the forward recognition system according to the second embodiment of the invention.

The processing unit 50 repeatedly executes the operation flow depicted in FIG. 7 during the travel of the motorcycle 100.

(Acquisition Step—1)

In step S201, the acquisition section 51 of the processing unit 50 acquires the travel information related to the vehicle speed V on the basis of the output of the front-wheel rotational frequency sensor 11 and the output of the rear-wheel rotational frequency sensor 12. The acquisition section 51 of the processing unit 50 also acquires the posture information related to the bank angle θL on the basis of the output of the inertial measurement unit 13.

(Control Step)

In step S202 to step S205, the control section 53 of the processing unit 50 uses the travel information and the posture information acquired in step S201 to determine which of the first sensing system 21 and the second sensing system 22 is used for the forward detection of the motorcycle 100.

More specifically, in step S202, the control section 53 changes the reference bank angle θLth in accordance with the travel information acquired in step S201. In the case where the travel information that corresponds to the low vehicle speed V is acquired in step S201, the control section 53 reduces the reference bank angle θLth at which the first sensing system 21 and the second sensing system 22 are switched in comparison with the case where the travel information that corresponds to the high vehicle speed V is acquired in step S201.

In step S203, the control section 53 determines whether the posture information related to the bank angle θL, which is acquired in step S201, is the posture information that corresponds to the smaller bank angle θL than the reference bank angle θLth. If Yes, the processing proceeds to step S204, and the control section 53 makes the forward environment detector 20 detect the environment forward of the motorcycle 100 by using the first sensing system 21. If No, the processing proceeds to step S205, and the control section 53 makes the forward environment detector 20 detect the environment forward of the motorcycle 100 by using the second sensing system 22.

(Acquisition Step—2)

In step S206, the acquisition section 51 of the processing unit 50 acquires the forward environment information that corresponds to the output of the forward environment detector 20.

(Recognition Step)

In step S207, the recognition section 52 of the processing unit 50 processes the forward environment information acquired in step S206 so as to recognize the target (for example, the obstacle, the preceding vehicle, the traffic sign, or the like).

<Action of Forward Recognition System>

A description will be made on action of the forward recognition system according to the second embodiment.

In the forward recognition system 1, in the case where the vehicle speed V of the motorcycle 100 is low, the reference bank angle θLth is set to be small in comparison with the case where the vehicle speed V of the motorcycle 100 is high. Therefore, in the state where the motorcycle 100 travels in the urban area or the like, the target can reliably be recognized.

The description has been made so far on the first embodiment and the second embodiment. However, the invention is not limited to the description of each of the embodiments. For example, all or parts of the embodiments may be combined.

REFERENCE SIGNS LIST

1: Forward recognition system
11: Front-wheel rotational frequency sensor
12: Rear-wheel rotational frequency sensor
13: Inertial measurement unit
20: Forward environment detector
21: First sensing system
22: Second sensing system
31: Transmitter
32: Receiver
50: Processing unit
51: Acquisition section
52: Recognition section
53: Control section
100: Motorcycle
A(A1, A2): Detection range
θ(θ1, θ2): Detection angle range
D(D1, D2): Detection distance range
θL: Bank angle
θLth: Reference bank angle
V: Vehicle speed
Vth: Reference vehicle speed P: Preceding vehicle
W: Width direction
H: Height direction

The invention claimed is:

1. A processing unit for a forward recognition system that recognizes a target ahead of a traveling motorcycle by using a forward environment detector provided in said motorcycle, the processing unit comprising:
 an acquisition section that acquires forward environment information corresponding to output of the forward environment detector; and
 a recognition section that recognizes the target on the basis of the forward environment information, and
 the processing unit further comprising:
 a control section that controls the forward environment detector wherein
 during travel of the motorcycle,
 the acquisition section acquires posture information related to a bank angle of the motorcycle, and
 the control section changes a detection angle range for forward detection of the motorcycle by the forward environment detector in accordance with the posture information.

2. The processing unit according to claim 1, wherein the detection angle range that is changed by the control section is a detection angle range in a width direction of the motorcycle.

3. The processing unit according to claim 1, wherein the detection angle range that is changed by the control section is a detection angle range in a height direction of the motorcycle.

4. The processing unit according to claim 1, wherein during the travel of the motorcycle,
 the control section executes forward detection of the motorcycle by the forward environment detector in a first detection angle range in the case where the acquisition section acquires the posture information that corresponds to the smaller bank angle than a reference bank angle, and executes the forward detection of the motorcycle by the forward environment detector in a second detection angle range that is larger than the first detection angle range in the case where the acquisition section acquires the posture information that corresponds to the larger bank angle than the reference bank angle.

5. The processing unit according to claim 4, wherein the forward environment detector at least includes: a first sensing element for the forward detection of the motorcycle in the first detection angle range; and a second sensing element for the forward detection of the motorcycle in the second detection angle range, and
 during the travel of the motorcycle,
 the control section executes the forward detection of the motorcycle in the first detection angle range through the forward detection of the motorcycle using the first sensing element in the case where the acquisition section acquires the posture information that corresponds to the smaller bank angle than the reference bank angle, and executes the forward detection of the motorcycle in the second detection angle range through the forward detection of the motorcycle using the second sensing element in the case where the acquisition section acquires the posture information that corresponds to the larger bank angle than the reference bank angle.

6. The processing unit according to claim 5, wherein the first sensing element and the second sensing element are radar transmitters that have different transmitting angle ranges from each other or radar receivers that have different receiving angle ranges from each other.

7. The processing unit according to claim 5, wherein the first sensing element and the second sensing element are ultrasonic transmitters that have different transmitting angle ranges from each other or ultrasonic receivers that have different receiving angle ranges from each other.

8. The processing unit according to claim 4, wherein during the travel of the motorcycle,
 the acquisition section acquires travel information related to a vehicle speed of the motorcycle, and
 the control section switches between the forward detection of the motorcycle in the first detection angle range and the forward detection of the motorcycle in the second detection angle range in consideration of the travel information.

9. The processing unit according to claim 8, wherein during the travel of the motorcycle,
 in the case where the travel information that corresponds to the lower vehicle speed than a reference vehicle speed is acquired, the control section executes the forward detection of the motorcycle by the forward environment detector in the second detection angle range even when the posture information that corresponds to the smaller bank angle than the reference bank angle is acquired.

10. The processing unit according to claim 8, wherein during the travel of the motorcycle,
 in the case where the travel information that corresponds to the low vehicle speed is acquired, the control section reduces the reference bank angle at which the first detection angle range and the second detection angle range are switched in comparison with the case where the travel information that corresponds to the high vehicle speed is acquired.

11. The processing unit according to claim 1, wherein the recognition section corrects the forward environment information by using the posture information and thereafter recognizes the target.

12. A forward recognition system comprising:
 the processing unit according to claim 1; and
 the forward environment detector.

13. A motorcycle comprising:
 the forward recognition system according to claim 12.

14. A processing method for a forward recognition system that recognizes a target ahead of a traveling motorcycle by using a forward environment detector provided in said motorcycle, the processing method comprising:
 an acquisition step of acquiring forward environment information that corresponds to output of the forward environment detector; and
 a recognition step of recognizing the target on the basis of the forward environment information, and
 the processing method further comprising:
 a control step of controlling the forward environment detector wherein
 during travel of the motorcycle,
 in the acquisition step, posture information related to a bank angle of the motorcycle is acquired, and
 in the control step, a detection angle range for forward detection of the motorcycle by the forward environment detector is changed in accordance with the posture information.

15. The processing unit according to claim 2, wherein
the detection angle range that is changed by the control
section is a detection angle range in a height direction
of the motorcycle.

16. The processing unit according to claim 2, wherein
during the travel of the motorcycle,
the control section executes forward detection of the
motorcycle by the forward environment detector in a
first detection angle range in the case where the acquisition section acquires the posture information that
corresponds to the smaller bank angle than a reference
bank angle, and executes the forward detection of the
motorcycle by the forward environment detector in a
second detection angle range that is larger than the first
detection angle range in the case where the acquisition
section acquires the posture information that corresponds to the larger bank angle than the reference bank
angle.

* * * * *